P. WEBER.

PHONOGRAPH REPRODUCER.

APPLICATION FILED MAY 3, 1910.

Reissued June 7, 1910. 13,120.

Witnesses:
Frank D. Lewis
Delos Holden

Inventor:
Peter Weber
by Frank L. Hyer
Atty.

UNITED STATES PATENT OFFICE.

PETER WEBER, OF ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH-REPRODUCER.

13,120. Specification of Reissued Letters Patent. Reissued June 7, 1910.

Original No. 951,496, dated March 8, 1910, Serial No. 456,701. Application for reissue filed May 3, 1910. Serial No. 559,428.

*To all whom it may concern:*

Be it known that I, PETER WEBER, a citizen of the United States, and a resident of Orange, in the county of Essex and State of New Jersey, have invented certain new and useful Improvements in Phonograph-Reproducers, of which the following is a description.

My invention relates to phonograph reproducers, and has for its object the provision of an improved stylus and mounting therefor, adapted more particularly for use with records in which the pitch of the record groove is one two-hundredth (1/200) of an inch. In order to properly track records of this character as now on the market it is necessary that the reproducer stylus be of microscopic size, since the record groove is formed by a stylus having a curved cutting edge, the diameter of which is only .008 of an inch. The reproducer stylus should have a rounded surface and should be so shaped as not to cause undue wear upon the record. It should also be supported in such a manner as to be capable of lateral movement, so that it will track the record groove properly; and it is also desirable that the stylus should be so connected to the diaphragm that the vertical movement of the stylus will be magnified, so as to produce an amplified movement of that portion of the diaphragm to which it is connected. These advantages are secured by the structure herein described and claimed.

In order that my invention may be more clearly understood, reference is hereby made to the accompanying drawing, of which—

Figure 1:
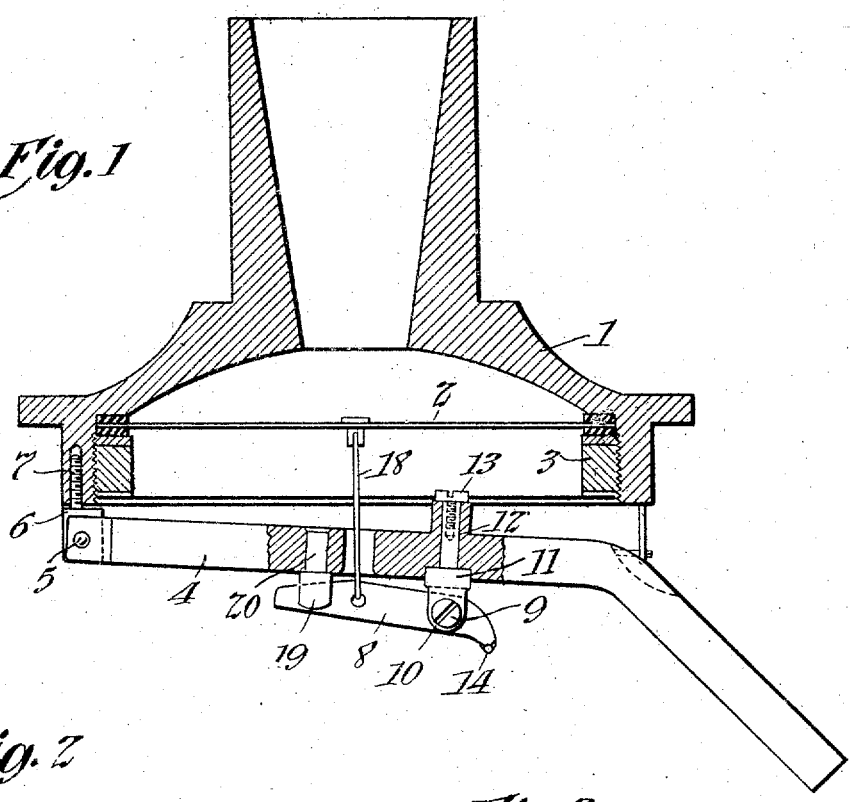
Figure 2:
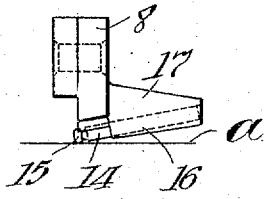
Figure 3:
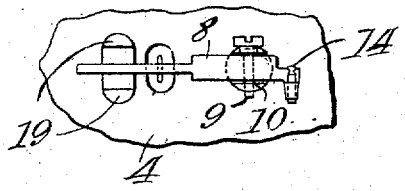

Figure 1 is a side elevation, partly in section, of a phonograph reproducer constructed in accordance with my invention; Fig. 2 is an end view, showing the stylus lever and stylus carried thereby in operative position with respect to the record surface, and Fig. 3 is a bottom plan view of the same and of the adjacent portion of the floating weight.

The reproducer shown comprises a sound box body 1 of usual form, within which the diaphragm 2 is clamped by the ring 3. The floating weight 4 is pivoted in the usual manner at 5 to the pivot block 6, supported by the screw 7, which is threaded within the body 1. The stylus lever 8 is pivoted on the screw 9, which is threaded within the lugs 10, depending from the member 11. The latter has an integral pin 12, rotatably mounted in the floating weight and supported by the screw 13 threaded within the end of said pin. This pin turns freely about its axis, and thereby permits lateral movement of the stylus 14 with respect to the record surface. This stylus, as shown, is formed with a button-shaped head 15 and a cylindrical shank 16, which is secured to a socket formed in the ear 17, which is integral with the lever 8. The shank 16 occupies an inclined position with respect to the record surface *a* (see Fig. 2). The radius of curvature of the head 15 of the stylus 14 in a plane transverse to the record groove is much smaller than the radius of curvature of the head in a plane parallel with the record groove. The bearing surface of the head is therefore narrow in a lateral direction whereby it is able to track the bottom of the record groove at all times, and it is comparatively broad in the direction along the record groove, whereby the tendency of the stylus to cut into or unduly wear the record surface is greatly reduced. A stylus of this shape having a bearing surface in which the diameters along and across the record groove are respectively .016 and .008 inch will track in a perfect manner a record of the type previously referred to without undue wear and is of such size that it can be readily handled and inspected by workmen in its various stages of manufacture, and can be produced by ordinary manufacturing processes and by workmen of ordinary skill.

There is a link 18 applied in the usual manner to the center of the diaphragm 2, and the lower end of the same is connected to the stylus lever 8 at a distance from its fulcrum which is considerably greater than the distance of the stylus 14 from the said fulcrum, whereby the movements of the stylus are exaggerated or amplified in their transmission to the center of the diaphragm. The angular movement of the lever 8 about the axis of the pin 12 is limited by a pair of stops 19 which depend from the pin 20, rigid with the floating weight 4.

Having now described my invention, what I claim is:

1. In a phonograph reproducer, a stylus formed with a surface curved upon different radii and adapted to engage a record groove of a maximum width considerably less than .01 inch, and means for supporting the same in such a position that the radius of curvature in a plane parallel to the direction of said groove, is greater than the radius of curvature in a plane at right angles thereto, substantially as set forth.

2. In a phonograph reproducer, a stylus having a rounded engaging surface adapted to track the record groove and a shank, and means for supporting the same in such a position that the shank extends transversely to the tangent to every record groove at the point contacted by the engaging surface of the stylus at any instant, substantially as set forth.

3. In a phonograph reproducer, a stylus having a rounded engaging surface adapted to track the record groove and a shank, and means for supporting the same in such a position that the shank extends substantially at right angles to the tangent to the record groove at the point contacted by the engaging surface of the stylus at any instant, substantially as set forth.

4. In a phonograph reproducer, a stylus having a rounded engaging head adapted to engage the record groove and a shank, and means for supporting the same in such a position that the shank extends transversely to the tangent to every record groove at the point contacted by the engaging surface of the stylus at any instant and is inclined upwardly with respect to the record surface at said point, substantially as set forth.

5. A reproducer stylus having a bearing surface curved in a plane transverse to the record groove on a radius sufficiently small to enable it to engage a record groove of circular cross-section and of a maximum width of not greater than .005 inch and curved on a substantially greater radius in a plane at right angles to said first plane, substantially as set forth.

6. In a phonograph reproducer, a stylus formed with a surface curved upon different radii and adapted to engage the record groove, and means for supporting the same in such a position that the radius of curvature in a plane parallel to the direction of said groove is greater than the radius of curvature in a plane at right angles thereto, a diaphragm, and an amplifying connection between said stylus and diaphragm, substantially as set forth.

7. In a phonograph reproducer, the combination of a stylus comprising a shank having at one end a rounded disk-shaped head at right angles thereto, the periphery of the disk being curved in a direction transverse to its diameter on a curve the radius of which is less than the radius of the disk, and a stylus lever having a boss at right angles to the length thereof provided with a socket for receiving the said shank, substantially as set forth.

8. As an article of manufacture, a stylus lever provided with a socket extending transversely to the plane of the lever and adapted to receive a stylus.

9. As an article of manufacture, a stylus lever having an extension transverse to the plane of said lever and provided with a socket adapted to receive a stylus.

10. As an article of manufacture, a stylus lever having an extension approximately at right angles to the plane thereof provided with a longitudinal socket adapted to receive a stylus.

11. In combination, a diaphragm, a stylus lever provided with means to support a stylus approximately at right angles to the plane thereof, means to support said lever, and means to connect said lever to said diaphragm in such a manner that the movements of the free end of the lever are exaggerated in their transmission to said diaphragm.

12. As an article of manufacture, a stylus lever and a stylus extending therefrom transversely to the plane the eof and having its bearing surface substantially in said plane, substantially as set forth.

This specification signed and witnessed this 30th day of Sept. 1908.

PETER WEBER.

Witnesses:
JOHN M. CANFIELD,
FRANK D. LEWIS.